United States Patent Office 3,708,399
Patented Jan. 2, 1973

3,708,399
FERMENTATION PROCESS FOR THE
PRODUCTION OF CITRIC ACID
Joseph L. Sardinas, Gales Ferry, Conn., assignor to
Pfizer Inc., New York, N.Y.
No Drawing. Filed May 27, 1971, Ser. No. 147,637
Int. Cl. C12d 1/04
U.S. Cl. 195—47                                         3 Claims

ABSTRACT OF THE DISCLOSURE

A process for producing citric acid by aerobically fermenting an aqueous carbohydrate-containing nutrient medium with a citric acid-accumulating strain of *Bacillus licheniformis*.

BACKGROUND OF THE INVENTION

This invention relates to a process for the production of citric acid by fermentation. In particular, it relates to a process for the production of citric acid by aerobically fermenting an aqueous carbohydrate-containing nutrient medium with a citric acid-accumulating strain of *Bacillus licheniformis*.

Because of its ease of assimilation, platability and low toxicity, citric acid is one of the most commonly used acids in the food and pharmaceutical industries. It is widely used as an acidulant in beverages and also as an antioxidant for inhibiting rancidity in fats and oils. Both the free acid and its salts are employed as buffers in the preparation of jams, jellies and gelatin preparations.

Most of the world's supply of citric acid is produced by fermentation processes, generally using selected strains of *Aspergillus niger* and a nutrient medium containing a carbohydrate material such as molasses as the main source of assimilable carbon. While these fermentation processes with *Aspergillus niger* are attractive, many difficulties are experienced. For example, over a period of time the citric acid producing capability of the *Aspergillus niger* culture tends to degenerate. Furthermore, a relatively long period of time, generally more than 7 days, is required for the production of large quantities of citric acid by such a fermentation process. In addition, much of the citric acid produced is conducted in a shallow pan, quiet surface fermentation process because *Aspergillus niger* strains are not optimally suited to an aerobic submerged fermentation process for producing citric acid.

The need for a rapid, aerobic submerged fermentation process has led to the discovery in recent years of selected strains of yeast from such genera as Candida and others which are capable of accumulating large amounts of citric acid in a carbohydrate or hydrocarbon-containing nutrient medium.

Japanese patent specification No. 13,677/68 describes a citric acid fermentation process which comprises the aerobic culture of hydrocarbon-utilizing strains of bacteria of the genus Arthrobacter. Similarly, Japanese patent specification No. 6,956/69 discloses a method for the preparation of citric acid by culturing a bacterium of the genus Corynebacterium in a hydrocarbon-containing nutrient medium. So far as is known, there have been no reports of other genera of bacteria capable of accumulating large amounts (at least 1 gram per liter) of citric acid. A primary objective of this invention is to provide a bacterial aerobic submerged fermentation process for producing citric acid which utilizes readily available carbohydrate materials as the main source of assimilable carbon.

SUMMARY OF THE INVENTION

This invention is concerned with a process for producing citric acid which comprises propagating a citric aicd-accumulating strain of *Bacillus licheniformis* under aerobic conditions in an aqueous carbohydrate-containing nutrient medium until a level of at least about 1 gram of citric acid accumulates per liter of said medium.

DETAILED DESCRIPTION OF THE INVENTION

It has been found that at least one strain of *Bacillus licheniformis* has the unusual ability to accumulate citric acid (at least 1 gram/liter) during the aerobic fermentation of an aqueous carbohydrate-containing nutrient medium. The publicly available strains of *Bacillus licheniformis* obtained from the American Type Culture Collection have been tested and found not to possess the unique property of accumulating at least 1 gram/liter of citric acid when aerobically cultured in an aqueous carbohydrate-containing nutrient medium. A new strain found to have this property has been deposited in a recognized public collection, the American Type Culture Collection, and given the number ATCC 21667.

The aqueous fermentation media contain a carbohydrate, source of assimilable nitrogen and inorganic salts. Useful carbohydrates include potato or corn starch, sucrose, glucose, fructose, galactose, moltose and dextrin.

Of the numerous nitrogen sources, corn steep liquor, wheat bran, soybean meal, cotton seed meal, urea, ammonium chloride or sulphate, amino acids, peptones and enzymatically digested proteins are preferred.

Trace vitamins and essential minerals are present as impurities in the crude nitrogen and carbohydrate sources, and it is usually not necessary to add them to the fermentation media. Either calcium carbonate or calcium hydroxide, or mixtures of the two, are preferably added to the fermentation media to neutralize the accumulating citric acid.

*Bacillus licheniformis* ATCC No. 21667 can be cultured at incubation temperatures of from 20° to 45° C. Good yields of citric acid are obtained in Erlenmeyer flasks shaken and incubated at about 37° C. for from about 38 hours to 7 days. For citric acid production in stirred fermenters, inoculum is prepared by transferring cells of *Bacillus licheniformis* ATCC No. 21667 grown on Brain Heart Infusion Agar (Difco) to an aqueous nutrient medium containing cerelose (crude glucose, Corn Products Inc.), N–Z Amine B (casein hydrolysate, National Dairy Products Corp.), yeast extract, sodium chloride and calcium carbonate. After shaking and incubating for about 16 hours at 37/ C., aliquots of inoculum are transferred to sterile media in fermenters which are stirred at about 1600 r.p.m. at a temperature of about 27° C. Compressed sterile air is forced through the fermentation medium at about ½ volume per volume of medium per minute. The pH of the fermentation medium is maintained at about 6.5 with periodic additions of a suspension of calcium hydroxide in sterile distilled water. The fermentation cycle is approximately 48 hours.

When substantial amounts of citric acid are produced (at least 1 gram/liter), the acid may be recovered from the fermentation medium by various methods well known to those skilled in the art. As the citric acid forms, it reacts metathetically with the calcium hydroxide or carbonate in the medium. Additional calcium carbonate is added after the end of the fermentation cycle to convert all the citric acid to insoluble calcium citrate, which is removed by filtration and converted to free citric acid by the addition of sulphuric acid.

The present invention embraces not only the use of the herein described organism but also of citric acid-accumulating mutants thereof produced by such measures as treatments with x-rays, ultraviolet light, nitrogen mustard and the like.

The following examples are merely illustrative and are not intended to limit the invention, the scope of which is defined by the appended claims.

EXAMPLE I

An aqueous medium containing the following ingredients is dispensed in 70 ml. portions in 500 ml. Erlenmeyer flasks, sterilized, and each flask inoculated with 0.3 ml. of a 10 ml. suspension in sterile distilled water of *Bacillus licheniformis* ATCC No. 21667 cells grown on Brain Heart Infusion Agar slants.

| Ingredients: | Grams/liter |
| --- | --- |
| Cerelose | 100.0 |
| N–Z Amine B | 10.0 |
| Yeast extract | 5.0 |
| NaCl | 1.0 |
| $CaCO_3$ | 5.0 |

The flasks are shaken on a rotary shaker at 37° C., adding to each flask 0.2 ml. of a 22% suspension of calcium hydroxide every 4 hours starting 14 hours after inoculation. The concentration of citric acid after 38 hours is 15.5 grams per liter.

EXAMPLE II

Erlenmeyer flasks containing the following nutrient medium are inoculated with *Bacillus licheniformis* ATCC No. 21667 cells as prepared in Example I.

| Ingredients: | Grams/liter |
| --- | --- |
| Cerelose | 150.0 |
| Corn steep liquor ml | 5.0 |
| Yeast extract | 2.0 |
| $NH_4Cl$ | 8.0 |
| $FeSO_4 \cdot 7H_2O$ | 0.4 |
| $MgSO_4 \cdot 7H_2O$ | 1.0 |
| $KH_2PO_4$ | 4.0 |
| $CaCO_3$ | 60.0 | pH 7.0 with NaOH.

After shaking on a rotary shaker at 37° C. for about 5 days, the concentration of citric acid is 42 grams/liter.

EXAMPLE III

Inoculum is prepared by dispensing 100 ml. portions of the medium of Example I (with 50 grams/liter of cerelose in place of 100 grams/liter) in 500 ml. Erlenmeyer flasks, and inoculating each flask with cells of *Bacillus licheniformis* ATCC No. 21667 as described in Example I. After shaking for 16 hours at 37° C., 100 ml. of inoculum is transferred to each of a number of 4 liter stirred fermenters each containing 2 liters of the medium of Example I. The fermenters are stirred at 1600 r.p.m. with an aeration rate of ½ volume per volume of medium per minute and incubation temperature of 27° C. Approximately 8 hours after inoculation, the pH of the fermentation medium in each fermenter is maintained at about pH 6.5 by additions of a 22% suspension of calcium hydroxide in sterile distilled water. The concentration of citric acid after 48 hours is about 18 grams/liter.

What is claimed is:

1. A process for producing citric acid which comprises propagating the microorganism *Bacillus licheniformis* ATCC No. 21667 under aerobic conditions in an aqueous carbohydrate-containing nutrient medium until a level of at least about 1 gram of citric acid accumulates per liter of said medium.

2. The process of claim 1 wherein the fermentation is conducted for between about 38 hours and 5 days.

3. The process of claim 1 wherein an inoculum is first prepared by growing *Bacillus licheniformis* ATCC No. 21667 in an aqueous nutrient medium for about 16 hours, and said inoculum is then introduced into additional aqueous carbohydrate-containing medium to initiate the fermentation.

References Cited

Tanaka et al., Chem. Abs., vol. 69, No. 95103X, 1968.

LIONEL M. SHAPIRO, Primary Examiner

G. M. NATH, Assistant Examiner